Feb. 28, 1967   A. E. BARCHENKO   3,307,078
ELECTRICAL SYSTEM
Filed Oct. 23, 1965   3 Sheets-Sheet 1

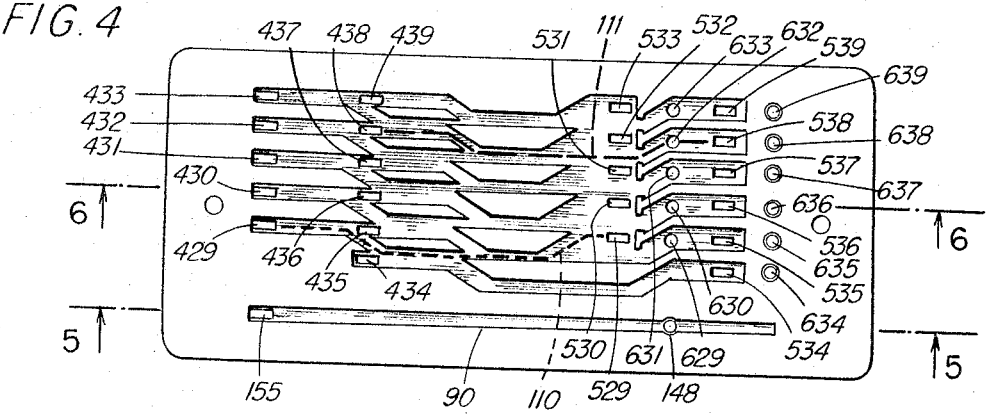
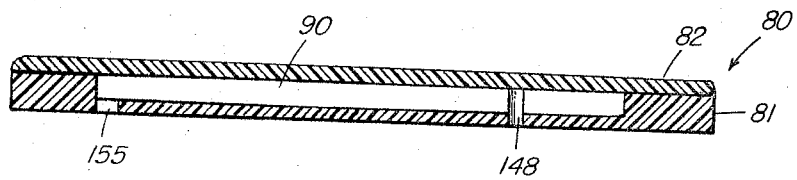
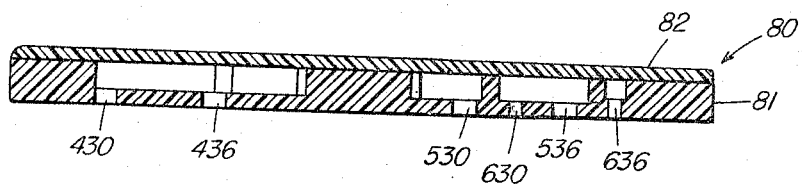
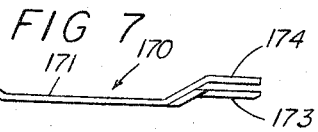
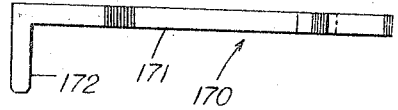
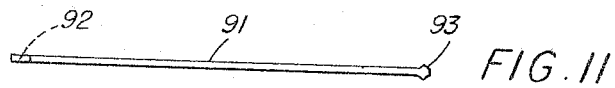
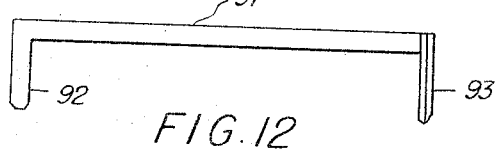

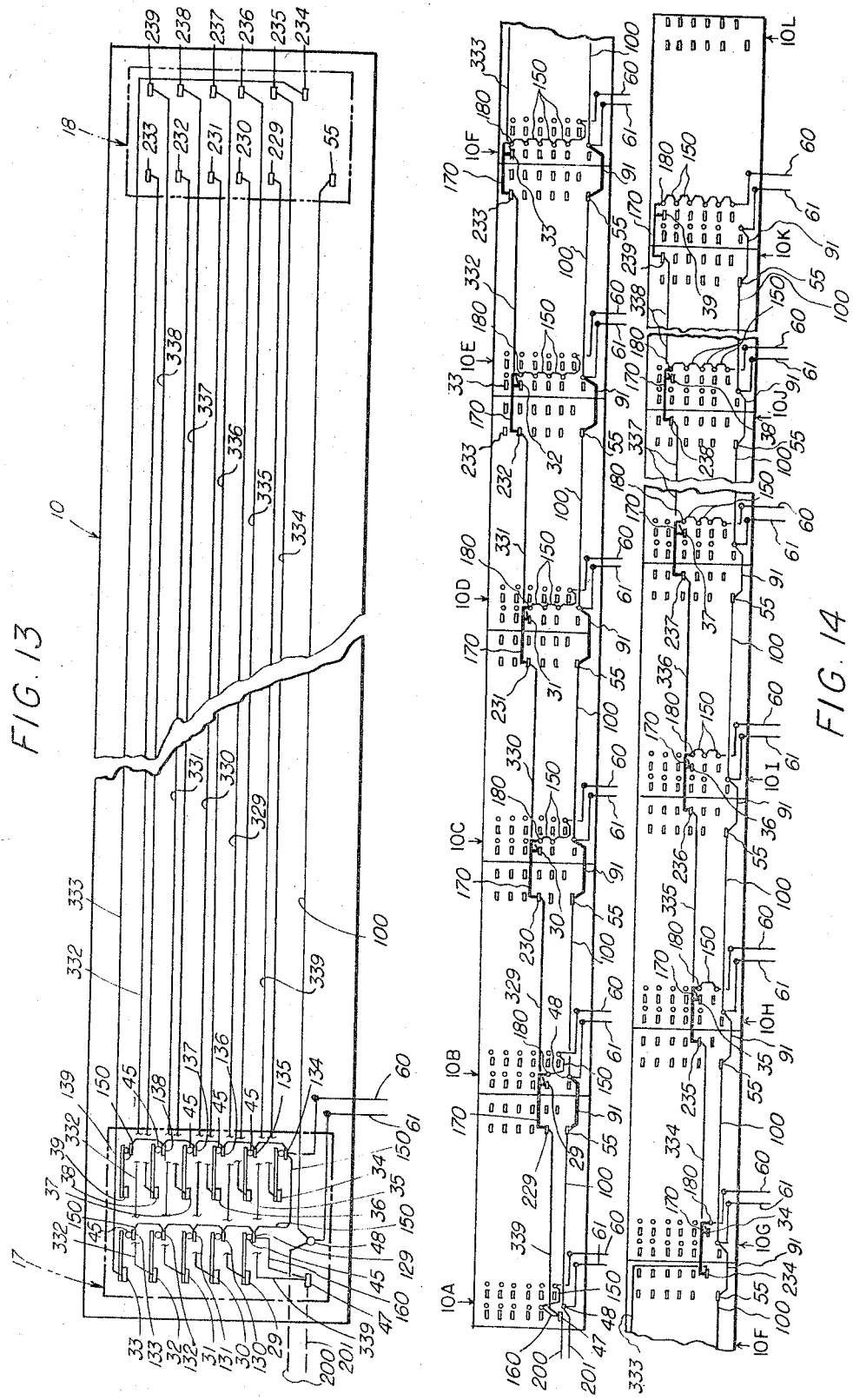

United States Patent Office 3,307,078
Patented Feb. 28, 1967

3,307,078
ELECTRICAL SYSTEM
Arthur E. Barchenko, 7 Bel Air Terrace,
Wayne, N.J. 07470
Filed Oct. 23, 1965, Ser. No. 503,922
8 Claims. (Cl. 317—99)

This invention relates to an electrical system. It is particularly concerned with an arrangement of pre-fabricated and pre-wired circuit units which may be connected together to form a system in which a pre-selected number only, of lamps or like power consuming devices may be installed.

Local building laws and codes frequently limit the number of electric lamps and like power consuming devices which may be wired from one power supply line. For example, a building code may limit the number of standard fluorescent lamp fixtures which can be connected in one power circuit to twelve pairs. Although it is known in the art to utilize pre-fabricated and pre-wired units in an electric circuit, it is possible for the electrician making the installation to exceed the code limitation by mistake or inadvertence, particularly since the usual circuit units are generally identical with no means associated therewith to limit the number of units that may be connected from one power line. That is to say, prior art equipment is not generally adapted for using only a pre-determined number of units, requiring specific sequential installation arrangement thereof, to insure correct installation. The installation of these prior art devices also involves using skilled electricians who must possess the requisite knowledge for making a correct installation. Thus, the need to use skilled labor adds considerably to overall building construction costs.

It is, therefore, an important object of the present invention to provide an electrical circuit arrangement which will limit the number of electrical units that may be connected from one line. Another object is to provide an electrical circuit arrangement for connecting and operating a number of electrically operated devices or fixtures wherein pre-fabricated and pre-wired circuit units may be installed rapidly and correctly by semi-skilled labor.

Another object is to provide an electrical circuit arrangement for operating a number of electrically operated devices or fixtures wherein a plurality of circuit units are used and which must be connected together in a pre-determined sequence to insure proper installation. Unless the circuit units are connected in proper sequential order, the incorrectly connected circuits will be inoperative.

Another object is to provide an electrical circuit arrangement employing various circuit units which must be arranged in pre-determined sequential order to achieve a fully operative circuit and which, because of the latter, is especially adapted to insure that the total number of devices or fixtures operated thereby does not exceed applicable building ordinances.

Another object is to provide an electrical circuit arrangement which because of its utilization of pre-fabricated and pre-wired circuit units reduces recourse to employment of skilled labor only for installation, thereby reducing overall building construction costs.

Other objects of the present invention will in part be obvious and will in part appear hereinafter.

The invention accordingly comprises the features of construction, combination of elements, and arrangement of parts, which will be exemplified in the construction hereinafter set forth and the scope of the invention will be indicated in the claims.

According to the invention, an electrical circuit system may be formed by connecting together a number of circuit chamber units each made as a pre-fabricated and pre-wired assembly. The circuit chambers are fabricated to be connected together by special terminal plugs, each of the latter being located in the circuit in a particular pre-determined sequential order. In this manner, full circuit continuity exists only when the various circuit units are connected together with the terminal plug associated therewith.

In the preferred embodiment of the invention, each circuit chamber is wired and constructed essentially the same. If desired, minor variations from one circuit chamber to the next may be incorporated without affecting the basic operation of the system. However, if maximum uniformity and interchangeability is desired, it is obvious that it will be preferable to have each circuit chamber identical. Each circuit chamber includes therein terminals or leads adapted to be connected to an electrical load.

The circuit chambers are designed to have two sections, which for convenience may be referred to as a power input and a power output section. The function of the input section is to furnish power to the load and to transfer power to the power output section. The input section comprises a source terminal and a series of effective electrical connection means which are disposed in an arrangement of mathematical progression having a predetermined last element. The mathematical progression may be any suitable arrangement of a series of terminals which for convenience in identification may be referred to as X terminals. If the system requires that a maximum of N loads be connected form one source, then the number of X terminals will be $N-1$.

The power output section has the function of transferring power from one circuit chamber to the next through the terminal plug connecting the two chambers. In each power output section there is a common terminal which is connected to the common terminal in the input section and a similar series of effective electrical connection means which, in the preferred embodiment, is also disposed in the mathematical progression similar to that employed for the X terminals. For convenience in identification the terminals in the series in the output section may be referred to as Z terminals and will also equal $N-1$. It is understood, of course, that more than $N-1$ terminals may be employed for various other purposes in either the input or output sections, but to effect the purposes of this invention only $N-1$ effective terminals are required.

Each circuit chamber is internally wired so that each X terminal is connected to a specific Z terminal. The manner of such wiring is a stepping arrangement with respect to the mathematical progression; that is an X terminal is connected to the Z terminal which is of the next higher order in the mathematical progression. Thus, the last X terminal in the series is not connected to any Z terminal and the first Z terminal in the series is not connected to any X terminal. The first Z terminal in the series is, however, connected to a source terminal in the circuit chamber.

The terminal plugs of the preferred embodiment of the invention are so designed that each contains a selectively positionable prong-like conductor which is used to make contact with appropriate X and Z terminals in the various circuit chamber units. Each terminal plug also contains a conductor element which acts as a neutral connector means to connect the common terminal of the power output section of one circuit chamber to the common terminal of the power input section of the next succeeding circuit chamber. Each terminal plug also contains an additional electrical connector means disposed to connect a selected Z terminal of one circuit chamber to an X terminal corresponding to the same order in the mathematical progression of the power input section of the next succeeding chamber. The additional connector means also connects the said X terminal to the source terminal. In this manner power is transmitted from one circuit chamber to the next until a maximum of N units are energized.

For a fuller understanding of the nature and objects of the invention, reference should be had to the following detailed description taken in conjunction with the accompanying drawings, in which:

FIGURE 4 is a plan view of a terminal plug constructed according to the present invention, the cover portion thereof being removed.

FIGURES 5 and 6 are sectional views of the terminal plug of FIGURE 4 as taken along the lines V—V and VI—VI, respectively.

FIGURE 7 is a plan view of a conductor element which is used in the terminal plug shown in FIGURE 4, the conductor element being selectively positioned therein in accordance with the location of the circuit chambers to be connected thereby in the overall circuit arrangement.

FIGURE 8 is a front elevational view of the line conductor element of FIGURE 7.

FIGURES 9 and 10 are, respectively, plan and elevational views of a connector pin utilized in the terminal plug in conjunction with the conductor element shown in FIGURES 7 and 8.

FIGURES 11 and 12 are, respectively, plan and front elevational views of a neutral conductor used in each terminal plug.

FIGURE 13 is a wiring diagram of a circuit chamber showing the manner in which it is pre-wired to interconnect the power input and power output ends thereof.

FIGURE 14 is a wiring diagram showing a number of circuit chambers arranged in a pre-determined sequential arrangement so as to limit the number of fluorescent lamp fixtures which may be operated from one power source, only that wiring operatively associated with each circuit chamber being shown.

Throughout the description, like reference numerals are used to denote like parts in the drawings.

Figure 1:
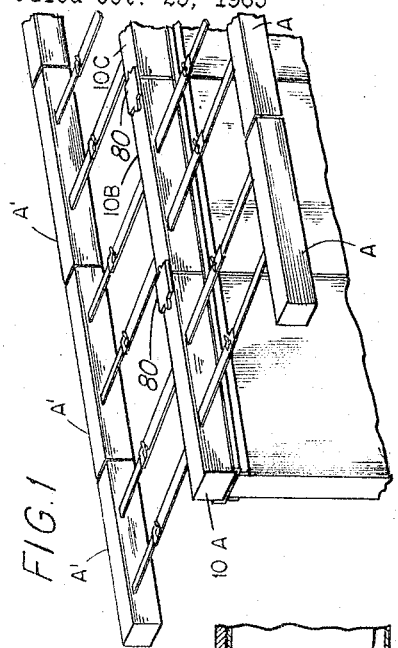
FIGURE 1 is a perspective view of a portion of an electric system for operating a number of fluorescent lamp fixtures, the system being formed by connecting together a number of circuit units with terminal plugs fabricated according to the principles of the present invention.

Referring now to FIGURE 1 of the drawings, the electrical system of the present invention includes a series of circuit chambers 10A, 10B, 10C, etc. each associated with one of the electrical loads to be connected with one power source. The electrical loads are represented by way of example, as each comprising a pair of fluorescent lamp fixtures A, A', it being intended that the system be limited as to the number of loads or pairs of fluorescent lamps that can be installed in any one circuit, to comply with local building laws. For the description that follows it will be assumed that it is desired to limit the total number of loads in the system to twelve pairs of lamps. However, it will be apparent to those skilled in the art that the invention may be made applicable for use with any desired number of electrical loads.

Figure 3:
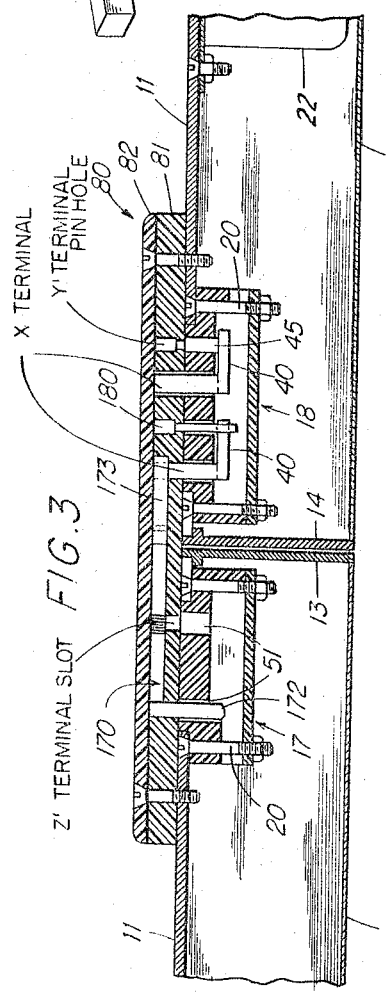
FIGURE 3 is a vertical sectional view through the juncture of two adjacent circuit chambers taken along the major axis thereof showing the manner in which the terminal plug used for connecting together the circuit chambers engages the power output and power input ends thereof, some parts being shown in full detail.
Figure 2:
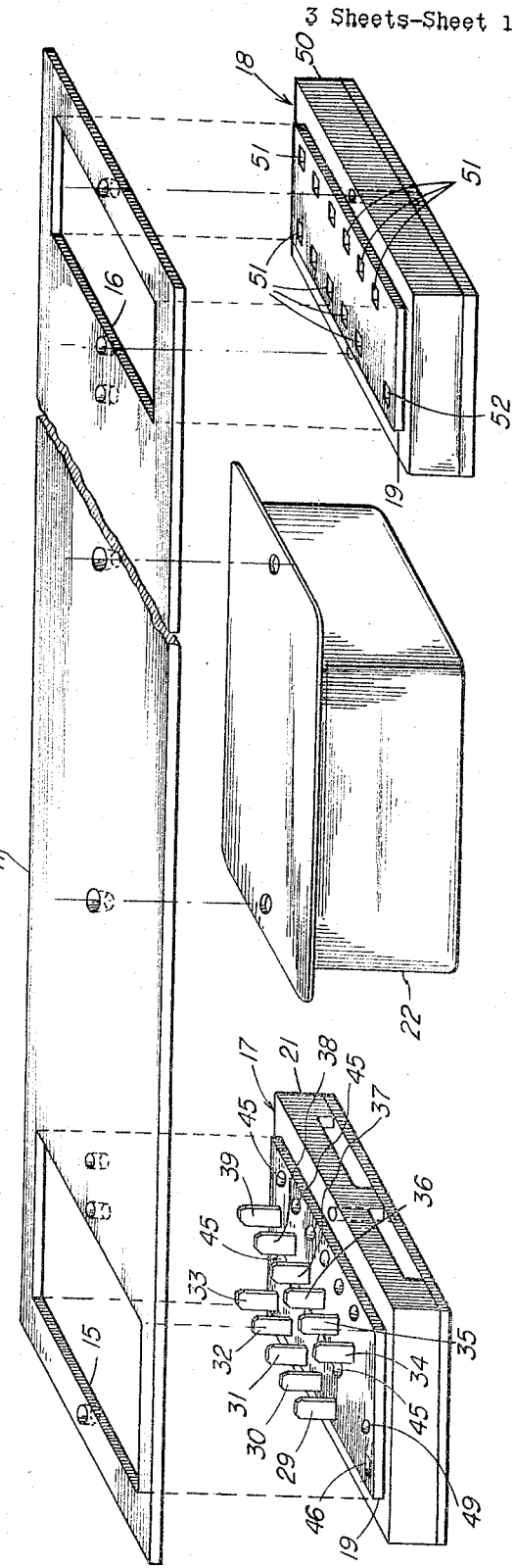
FIGURE 2 shows in exploded perspective view one of the circuit units or circuit chambers used in the present invention, some parts not being shown for purposes of clarity.

The general details of construction of the circuit chambers are shown in FIGURES 2 and 3 from which it will be apparent that the circuit chambers 10 are readily suited for assembly as pre-fabricated units. Each circuit chamber 10 comprises an assembly having parallel upper and lower walls 11 and 12 connected at the ends with a pair of end walls 13 and 14, the aforementioned walls being secured together in known manner so as to form a chamber-like enclosure. The upper wall 11 adjacent each end is provided with relatively large slotted openings 15 and 16 each intended to receive one of the power input and output terminal assemblies 17 and 18 which will be described in greater detail later on in the description. Let it suffice for the present to note that the power input and output terminal assemblies are stepped as at 19 so as to present upper surfaces flush with the outer surface of the upper wall 11, the assemblies being secured to the upper wall 11 by means of countersunk screws 20 as best seen in FIGURE 3. Each circuit chamber 10 also includes a ballast section 22 secured therein in a manner similar to that employed for securing the power input/output terminals, the ballast section 21 being provided for making actual electrical connection to the electrical load in known manner.

The power input terminal section 19 of each circuit chamber 10 may be referred to generally as a male socket member and comprises a block 21 of insulator material wherein is mounted a series of electrically conductive upright prongs 29–39, the prongs 29–39 being arranged in the order of a mathematical progression having a predetermined last element and for purposes of convenience of description hereinafter referred to generally as "X" terminals. The prongs 29–39 each have in addition to the upright portion shown in FIGURE 2, an integral angled portion 40 extending laterally in the block 21 adjacent one of a series of pin holes 45 corresponding in number to and arrangement with the prongs 29–39. Located within the respective pin holes 45 are terminal elements 129–139 hereinafter designated for purposes of description, as "Y" terminals, the actual terminal elements not being shown in FIGURES 2 and 3. The power input section 17 also includes a slotted opening 46 in the block, the slotted opening 46 having therein a terminal element 47 hereinafter referred to as a "source terminal." Adjacent the "source terminal" within the power input terminal section 17 is an additional terminal element 48 hereinafter designated by way of convenience as a "common terminal," the common terminal being supported down within an opening 49 in the block. The electrical significance of the aforementioned terminal elements 129–139, 47, and 48 may be better seen by referring to FIGURE 13.

The power output terminal section 18 of each circuit chamber 10 may be generally termed a female socket member comprised of a block 50 of insulator material having formed therein a plurality of opening slots 51 (arranged in the same order as the prongs 29–39) in the circuit chamber power output terminal section 17, the arrangement of slots 51 being best seen in FIGURE 2. Positioned in the block 50 within each of the slots 51 are terminal elements 229–239, said terminal elements being shown in FIGURE 13 and designated hereinafter for descriptive purposes as being "Z" terminals. The power output terminal section also includes an additional slotted opening 52 within which is located terminal element 55 designated for purposes of description as being a "common terminal."

Each circuit chamber 10 in the system is intended to serve two functions, first to supply electrical power to the electrical load associated therewith and second, to transfer electrical power to the next succeeding circuit chamber in the system when properly electrically connected therewith. To that end, each circuit chamber 10 is internally wired in the manner illustrated in FIGURE 13, the wiring arrangement and general construction being essentially the same in all circuit chambers to further the adaptability and interchangeability of the circuit chambers for use at any location in the system. The wiring is such that X terminals 29–38 in the power input terminal section 17 are each connected directly by means of wire leads 329–338 to specific Z terminals 230–239 in the power output terminal section 18. The manner of connection is a stepping arrangement with respect to the mathematical progression; that is an X terminal, as for example X terminal 29, is connected by the wire lead 329 to the Z terminal 230 which is of next higher order in the mathematical progression. Thus, the last X terminal 39 in the series is not connected to any Z terminal and the first Z terminal 229 in the series is not connected to any X terminal. The first Z terminal 229 is however, connected to the source terminal 47 by means of a lead 339.

Each of the circuit chamber 10 also includes a pair of leads 60 and 61 intended to be connected to the electrical loads associated with the respective circuit chambers. One of the leads 61 is connected with the common terminal 48 in the power input terminal section and for convenience, the other lead 60 is connected with one of the Y terminals 134 in the series of Y terminals 129–139. Each circuit chamber also includes a wire 100 connected with the common terminal 48 in the power input terminal section 17 and with the common terminal 55 in the power output terminal section 18.

The various Y terminals 129–139 in the power input terminal section are all interconnected by means of a wire loop 150, and the first Y terminal 129 is connected with the source terminal 47 by means of a connector lead 160. The purpose in interconnecting the Y terminals in the foregoing manner is that electrical power is connected to the load associated with each circuit chamber when the requisite Y terminal therein is connected with its associated X terminal, power input to the circuit chamber being at the said X terminal in the manner as will appear later on in the description.

In a preferred embodiment, the electrical system utilizes a plurality of circuit chambers each associated with one of the electrical loads and adapted to be arranged in a pre-determined sequential order, the circuit chambers being electrically interconnected by means of the terminal plugs 80 shown in FIGURES 4 to 12 and which will now be described. Each terminal plug 80 is intended to provide a means for interconnecting the power output terminal section 18 of one circuit chamber 10 with the power input terminal section 17 of the next succeeding circuit chamber in the system. Essentially, each terminal plug comprises a body made preferably of an insulator material and having a base portion 81 to which may be removably secured a cover piece 82. The base portion 81 may for convenience of manufacture be of molded construction and is provided with a groove 90 adapted to receive a common conductor 91, the shape of which is shown in FIGURES 11 and 12. Thus the common conductor 91 is provided at one end with a flat blade like finger 92 and at the other end with another finger 93 which for convenience has a shape different than that of the blade finger 92. In use, the common conductor is positioned in the groove 90 with the blade like finger 91 extending downwardly through a slotted opening 155 in the base portion at one end of the groove, and with the other finger 92 extending through an opening 148 adjacent the other end of the groove. Thus, the fingers 92 and 93 of the common conductor will extend outwardly from the bottom of the terminal plug 80 to adapt them for connecting the common terminal 55 of the power output terminal section 18 of one circuit chamber 10 with the common terminal 48 of the power input terminal section 17 of the next succeeding circuit chamber.

Each terminal plug 80 as best seen in FIGURE 4 also includes a first series of slotted openings 429–439 therein arranged in the same mathematical progression previously described and for convenience of description hereinafter referred to as Z' terminal receiving slots. The terminal plug 80 also includes a second series of slotted openings 529–539 similarly arranged in the same mathematical progression and for convenience to be referred to hereinafter as X' terminal receiving slots. Cooperatively associated with each of the latter slots 529–539 are a series of pin holes 629–639 designated for sake of convenience as being Y' terminal pin holes. The Z' terminal receiving slots, X' terminal receiving slots and Y' terminal pin holes are intended to cooperate one with each of the others in a specific pre-determined manner for receiving conductor means hereinafter described and which establish an effective electrical connection means between succeeding circuit chambers in the system. To that end, the aforementioned slots and pin holes are arranged in specific grooves in the terminal plug base portion. To illustrate this feature, the grooved path 110 illustrated in FIGURE 4 in short dashed lines extends from the first Z' terminal receiving slot 429 in the mathematical progression, across the terminal plug being offset downwardly as shown and near its right end portion extending back upwardly to the location of the first X' terminal receiving slot 529 in the mathematical progression. It also will be noted that the first Y' terminal pin hole 629 in the mathematical progression is located alongside X' terminal receiving slot 529. The remaining groove paths follow a like course for the rest of the Z' and X' terminal receiving slots according to the mathematical progression with the corresponding Y' terminal pin holes being located spacedly adjacent each X' terminal receiving slot. Thus, the grooved path 111 illustrated in longer dashed lines extends between Z' terminal receiving slot 438, is offset downwardly as shown and extends back upwardly adjacent X' terminal receiving slot 538, its cooperating Y' terminal pin hole 638 being located spacedly alongside X' slot 538. It will be readily apparent then that the grooved paths are thusly arranged to provide for selectively positioning the conductor element 170 shown in FIGURES 7 and 8 in the terminal plugs according to a predetermined positioning determined by the location of the two specific circuit chambers 10 in the system to be connected by a particular terminal plug 80.

The connector element 170 used in each terminal and illustrated in FIGURES 7 and 8 has a generally flat body 171 corresponding in plan outline to the shape of the grooved paths in the terminal plug and has a generally flat angled extension 172 hereinafter designated a Z' terminal. The other end of connector element 170 is comprised of a pair of flexible fingers 173 and 174 normally spaced apart as shown and together constituting an X' terminal. It will be readily apparent that when the connector element 170 is positioned in the terminal plug, its angled extension 172 will extend downwardly therein through one of the Z' terminal slots and the flexible fingers 173 and 174 thereon will straddle the X' terminal slot corresponding therewith in order of the mathematical progression. Cooperatively associated with the connector element 170 is a separate conductor pin 180 shown in FIGURES 9 and 10 and referred to hereinafter as a Y' terminal. When a connector element 170 is positioned within a terminal plug 80, the Z' and X' terminals thereof along with the Y' terminal constituted by the conductor pin 180 cooperatively associated therewith will comprise effective electrical connection means to connect the power output terminal section 18 of one circuit chamber 10 with the power input terminal section 17 of the next succeeding circuit chamber 10 and thus provide a transfer of electrical power to said succeeding circuit chamber and electric power to the electrical load associated therewith.

Further understanding of the invention will become apparent from a description of the manner in which it is used to connect a predetermined number of electrical loads from one power source. As was mentioned, the represented embodiment is intended to for use in connecting $N=12$ loads to one power source. FIGURE 14 illustrates the manner in which the circuit chambers 10A–10L each associated with one of the loads may be arranged. In FIGURE 14, for purposes of clarity, only that wiring operatively associated with each circuit chamber is shown. For a fuller understanding of the arrangement of FIGURE 14, concurrent reference should be made to FIGURE 13 which illustrates the full circuit chamber wiring which is essentially the same for all. Referring now to the first two circuit chambers 10A and 10B in the system, the function of circuit chamber 10A is to connect its associated electrical load to power, and it also must provide a transfer of electrical power to the next succeeding circuit chamber 10B. Thus, after the various circuit chambers have been installed on a support such as a ceiling or wall in the field, an electrician will connect the source terminal 47 and the neutral terminal 48 in the power input terminal section 17 of the first circuit chamber 10A to an outside electrical power source brought thereto by means of the leads 200 and 201. At this point, installation of the system may be effected thereafter by labor other than skilled electricians. With the connection of the power leads 200 and 201 to circuit chamber 10A, the electrical load associated therewith will receive electrical power since the neutral terminal 48 is connected to the load by means of lead 61 and the source terminal 47 is a connected by means of connector lead 160, Y terminal 129, wire loop 150 and Y terminal 134 to the other load lead 60.

Having fulfilled the first function of connecting the associated electrical load to an electric power source, it is now necessary to transfer electrical power from circuit chamber 10A to the next succeeding circuit chamber 10B in the system. A description of the manner in which this is done now follows. It will be noted that the source terminal 47 in the power input terminal section 17 in circuit chamber 10A in connected by means of wire 339 to the Z terminal 229 in the power output terminal section 18 of the circuit chamber 10A, thus there is selectrical power available to said Z terminal 229. Transfer of power from circuit chamber 10A to the next succeeding chamber 10B is effected by interconnecting a Z terminal in the power output terminal section 18 of circuit chamber 10A with an X terminal in the power input terminal section 17 of the next succeeding circuit chamber 10B by means of a terminal plug 80. Preliminary to connecting the circuit chambers with the terminal plug 80 the laborer making the connections may, if the terminal plug has been pre-assembled, check it to insure a connector element 170 and pin connector 180 are properly positioned therein in accordance with the respective Z and X terminals to be connected thereby. Thus, the laborer will check to insure that the extension 172 on the connector element 170 is inserted through the Z' terminal slot 429 and extends in the requisite grooved path so that its flexible fingers 173 and 174 straddle the X' terminal slot 529. Furthermore, the pin conductor 180 associated with the Y' pin receiving terminal 629 should be inserted therein. In this manner the laborer insures that when the terminal plug 80 is plugged into the power output terminal section 18 and power input terminal section 17 of circuit chambers 10A and 10B respectively, the connector element 170 will connect the Z terminal 229 in circuit chamber 10A with the X terminal 29 in circuit chamber 10B which is of the same order in the mathematical progression. Furthermore, the pin connector 180 will connect the X terminal 29 with the Y terminal 129 in the power input terminal section 17 of the said succeeding circuit chamber 10B. The common conductor 91 of course, also must be properly positioned in the terminal plug 80, i.e., blade finger 92 extending through the slotted opening 155 at one end and the finger 93 through the opening 148 at the other end of groove 90. Thus, the common conductor 91 will connect the common terminal 55 of power output section 18 in circuit chamber 10A with the corresponding common terminal 48 in the power input terminal section 17 of circuit chamber 10B. The foregoing connection thus provides that the lead 60 connected with the load associated with said succeeding circuit chamber 10B is connected with power through Y terminal 129, wire loop 150 and Y terminal 134. Since the other lead 61 connected with the electrical load associated with circuit chamber 10B is connected with the common terminal 48 in the power input terminal section 17 of said succeeding circuit chamber 10B, continuity to load is insured.

Since the X terminal 29 in the power input terminal section of 17 of circuit chamber 10B is also directly connected with the Z terminal 230 of next highest order in the power output terminal section 18 of said circuit chamber 10B transfer power is thus present at said Z terminal 230 for transferring power to the X terminal 30 of the same order in the next succeeding circuit chamber 10C when circuit chambers 10B and 10C are connected with a terminal plug 80. The succeeding circuit chambers in the system are thereafter connected together by means of terminal plugs 80 in similar manner, the connector elements 170 and pin connectors 180 in the terminal plugs being selectively positioned therein in accordance with the asecending order of the mathematical progression to achieve the effective electrical connections required in the particular circuit chambers. Thus, for example, circuit chambers 10G and 10H are intended to be connected together by a terminal plug 80 wherein a connector element 170 is positioned therein with its extension 172 extending in the Z' terminal slot 435 and its flexible fingers 173, 174 straddling the X' terminal slot 535, with a connector pin 180 being positioned in the Y' terminal pin hole 635. The neutral connector element 91 is, of course, positioned in the slotted openings 155 and 148 as previously described, the neutral connector positioning being the same in all terminal plugs. Thus, when the terminal plug is inserted in circuit chambers 10G and 10H, extension portion 172 of the connector element 170 therein will engage the Z terminal 235 in the power output terminal section 18 in circuit chamber 10G to which power was transferred from the power input terminal section 17 therein by means of wire lead 334, and the X terminal 35 in the power input terminal section 17 in circuit chamber 10H will extend up into the terminal plug to engage the flexible fingers 173 and 174 at the end of the connector element 170. Additionally, the pin connector 180 cooperatively associated with the connector element 170 and positioned in the terminal plug in pin receiving terminal hole 635 will connect the X terminal 35 and the Y terminal 135 in the power input terminal section of circuit chamber 10H with the latter connecting the load lead 60 with power through wire loop 150 and Y terminal 134. The neutral connector element in the terminal plug, of course, connects the common terminal 55 in the Z terminal section of circuit chamber 10G with the common terminal 48 in the X terminal section of circuit chamber 10H, the latter being connected to load lead 61.

From the foregoing, it is believed that it will be obvious to those skilled in the art that the various circuit chambers 10 are connected together in a similar manner by positioning the connector element and pin connector in the terminal plug with which they are connected in accordance with the order of the various Z and X terminals in the mathematical progression associated with the specific circuit chambers.

It will be noted that the last X terminal 39 in the mathematical progression is not connected with any Z terminal and that the first Z terminal 55 is not connected with any X terminal. In this manner, the maximum number of loads that can be connected in the system is limited to N loads, there being provided only $N-1$ effective X and Y terminals in each circuit chamber. Thus, if a laborer attempted to connect a 13th electrical load in the system by adding another circuit chamber after circuit chamber 10L, there would be no effective Z terminal in the latter to which a power connection could be made between it and an X terminal in the 13th chamber.

From the above description, it will be readily understood that proper installation of the system entails connecting two succeeding circuit chambers 10 by means of a terminal plug 80 wherein the connector element 170 and pin connector 180 are positioned in specific pre-determined Z' and X' terminal slots and Y' terminal pin hole respectively. Unless the foregoing arrangement is effected, there will be a break in the continuity of the system. For example, referring to the connections of circuit chambers 10D and 10E, the electric power is intended to be transferred from circuit chamber 10D by Z terminal 232 in said circuit chamber 10D being connected with the X terminal 32 in circuit chamber 10E. The latter is intended to be effected by inserting the connector element 170 in the terminal plug 80 connecting these circuit chambers so that its extension 172 extends through the Z' terminal receiving slot 432 with its flexible fingers 173, 174 straddling the X' terminal slot 532. Furthermore, the connector pin 180 cooperatively associated with the connector element should be positioned in the Y' terminal pin hole 632. On the other hand, if the laborer in positioning the connector element in the terminal plug should insert it so that the extension 172 thereon extends through the wrong Z' terminal slot, as for example, slot 433 and that the fingers 173 and 174 on the connector element straddle X' terminal slot 533, it will be seen that the terminal plug 80 when inserted into the respective circuit chambers will connect Z terminal 233 in circuit chamber D and X terminal 33 in circuit chamber 10E. Since electric power is in the order of the mathematical progression available at the Z terminal 232 only in circuit chamber 10D, there will be a break in continuity and no electrical power will be transferred to circuit chamber 10E. On the other hand, it is possible that the laborer may position connector element 170 properly within the terminal plug 80 but incorrectly position therein the connector pin 180. As for example, he may insert the connector pin 180 in the Y' terminal pin hole 633 but put the connector element 170 in the correct Z', X' terminal receiving slots 432, 532. If this is done, circuit chamber E will receive electrical power from the Z terminal 232 in circuit chamber 10D and will also transfer from its X terminal 32 by means of wire lead 332, power to the Z terminal 233 therein. However, the load lead 60 connected with the load associated with circuit chamber 10E, will not be connected with power since the connector pin 180 which is intended to connect X terminal 32 with Y terminal 132 is missing. The pin instead will connect with Y terminal 133 of next higher order with an X terminal 33 that is without power. Thus, while it is possible for one circuit chamber to transfer electric power to the next succeeding circuit chamber, it is still possible that power will not be supplied to the specific load associated with the first mentioned circuit chamber. Thus, it will be apparent that the connector element 170 serves the function of a power transfer connector means and the pin connector 180 functions as a load connector means.

It should be understood that the above described system is subject to modification within the scope of the inventive concept. For example, the circuit chambers each contain several series of terminals arranged in a mathematical progression. Obviously, other terminals could also be included for other purposes. However, if it is desired that the system be used to limit the number of electrical loads N which can be connected with one power source, the number of effective X, Y and Z terminals included in each circuit chamber should not exceed N−1. It will be apparent that other variations of the actual construction of the circuit chamber may be practiced, as for example, the terminal plugs for connecting together circuit chambers could be preassembled in the factory having the connector element 170 and connector pin 180 pre-positioned therein. The terminal plug could then be stamped or marked with suitable indicator means to indicate which circuit chambers in the overall system are intended to be connected by the specified pre-assembled terminal plugs. Furthermore, the power input and power output terminal sections in the circuit chambers are represented as being male and female socket type assemblies. They could within the scope of the invention both be male or female types with the connector element in the terminal plug being altered accordingly to suit the need.

Thus, it will be seen that the present invention provides a scheme for connecting a fixed number of N electrical loads from one power source. Connections are made simply by plugging pre-wired units into each other, and the system precludes error because it will not operate fully unless properly connected.

It will thus be seen that the objects set forth above, among those made apparent from the preceding description, are efficiently attained and, since certain changes may be made in the above construction and different embodiments of the invention could be made without departing from the scope thereof, it is intended that all matter contained in the above description or shown in the accompanying drawing shall be interpreted as illustrative and not in a limiting sense.

What is claimed is:

1. A system for connecting no more than "N" electrical loads from one power source comprising (a) a plurality of circuit chambers each having at least two leads adapted to be connected to one of the electrical loads, (b) a plurality of terminal plugs each adapted to interconnect electrically two of said circuit chambers to energize the second of said circuit chambers from the first of said circuit chambers, (c) each of said circuit chambers having therein a power input section and a power output section, (d) said power input section containing a source terminal and a common terminal, said common terminal being connected to one of the leads intended to be connected to the load, said source terminal being connected to the other of said leads, and a first series of effective electrical connection means disposed in an arrangement of mathematical progression, the number of said electrical connection means in said series being $N-1$, each one of said first series of electrical connection means comprising an X terminal, (e) said power output section of each circuit chamber having a common terminal connected to the common terminal of said power input section, and a second series of effective electrical connection means Z disposed in a like arrangement of mathematical progression, the number of said Z electrical connection means in said series being $N-1$, (f) said source terminal of said power input section being connected to the first Z terminal in the series of Z terminals of the second electrical connection means of said power output section, each X terminal of said first series of electrical connection means other than the last one thereof being connected to the Z terminal of said second series of electrical connection means which is the next higher order in the mathematical progression, (g) each of said terminal plugs having a neutral connector means, and additional connector means disposed therein, the additional connector means being disposed in each of said terminal plugs in a manner when said terminal plugs are operatively disposed, to connect a selected one of said Z terminals of the power output section of one circuit chamber to the corresponding one of said X terminals of the power input section of the next succeeding chamber, said additional connector means also connecting said X terminal with the source terminal of said succeeding chamber, said neutral conductor means connecting the common terminal of the power output section of said one circuit chamber to the common terminal of the power input section of said succeeding circuit chamber.

2. A system for connecting no more than "N" electrical loads from one power source comprising
 (a) a plurality of circuit chambers each having at least two leads adapted to be connected to one of the electrical loads,
 (b) a plurality of terminal plugs each adapted to interconnect electrically two of said circuit chambers to energize the second of said circuit chambers from the first of said circuit chambers,
 (c) each of said circuit chambers having therein a power input section and a power output section,
 (d) said power input section containing a source terminal and a common terminal, said common terminal being connected to one of the leads intended to be connected to the load, said source terminal being connected to the other of said leads, and a first series of effective electrical connection means disposed in an arrangement of mathematical progression, the number of said electrical connection means in said series being $N-1$, each one of said first series of electrical connection means comprising an X terminal,
 (e) said power output section of each circuit chamber having a common terminal connected to the common terminal of said power input section, and a second series of effective electrical connection means Z disposed in a like arrangement of mathematical progression, the number of said Z electrical connection means in said series being $N-1$,
 (f) said source terminal of said power input section being connected to the first Z terminal in the series of Z terminals of the second electrical connection means of said power output section, each X terminal of said first series of electrical connection means other than the last one thereof being connected to the Z terminal of said second series of electrical connection means which is of the next higher order in the mathematical progression,
 (g) each of said terminal plugs have a neutral conductor means and a series of openings disposed therein in an arrangement of mathematical progression, the number of openings in said series being $N-1$, said openings comprising groups of Z' and X' terminal receiving means, an effective electrical connection means associated with one group of said Z' and X' terminal receiving means,
 (h) each of said terminal plugs, when operatively disposed, connecting by means of said effective electrical connection means in said terminal plugs, a predetermined one of said Z terminals of the power output section of one chamber to a corresponding one of said X terminals of the same order in the mathematical progression of the power input section of the next succeeding circuit chamber, said effective electrical connection means in each of said terminal plugs also connecting the aforesaid X terminal with the source terminal, said neutral conductor means connecting the common terminal of the power output section of said one terminal of said one circuit chamber to the common terminal of the power input section of the said next succeeding circuit chamber.

3. A system for connecting no more than "N" electrical loads from one power source comprising
 (a) a plurality of circuit chambers each having at least two leads adapted to be connected to one of the electrical loads,
 (b) a plurality of terminal plugs each adapted to interconnect electrically two of said circuit chambers to energize the second of said circuit chambers from the first of said circuit chambers,
 (c) each of said circuit chambers having therein a power input section and a power output section,
 (d) said power input section containing a source terminal and a common terminal, said common terminal being connected to one of the leads intended to be connected to the load, said source terminal being connected to the other of said leads, and a first series of effective electrical connection means disposed in an arrangement of mathematical progression, the number of said electrical connection means in said series being $N-1$, each one of said first series of electrical connection means comprising an X terminal and a Y terminal, all of said Y terminals in said series being connected to said source terminal,
 (e) said power output section of each circuit chamber having a common terminal connected to the common terminal of said power input section, and a second series of effective electrical connection means Z disposed in a like arrangement of mathematical progression, the number of said Z electrical connection means in said series being $N-1$,
 (f) said source terminal of said power input section being connected to the first Z terminal in the series of Z terminals of the second electrical connection means of said power output section, each X terminal of said first series of electrical connection means other than the last one thereof being connected to the Z terminal of said second series of electrical connection means which is of the next higher order in the mathematical progression,
 (g) each of said terminal plugs having a neutral conductor means and a series of openings disposed therein in an arrangement of mathematical progression, the number of openings in said series being $N-1$, said openings comprising groups of Z', X' and Y' terminal receiving means, an effective electrical connection means including a first connector associated with the Z' and X' terminal receiving means of one group and a separate connector associated with the corresponding Y' terminal receiving means of said group,
 (h) each of said terminal plugs, when operatively disposed, connecting by means of the first connector of said effective electrical connection means in said terminal plugs, a predetermined one of said Z terminals of the power output section of one chamber to a corresponding one of said X terminals of the same order in the mathematical progression of the power input section of the next succeeding circuit chamber, the separate connector of said effective electrical connection means connecting the aforesaid X terminal with its associated Y terminal, said neutral conductor means connecting the common terminal of the power output section of said one terminal of said one circuit chamber to the common terminal of the power input section of the said next succeeding circuit chamber.

4. A system for connecting no more than "N" electrical loads from one power source comprising
 (a) a plurality of circuit chambers each being wired and constructed essentially the same and each having two leads to be connected to one of the electrical loads,
 (b) a plurality of terminal plugs each adapted to interconnect electrically two of said circuit chambers in proper sequential order to energize the second of said circuit chambers from the first of said circuit chambers,
 (c) each of said circuit chambers having therein a power input section and a power output section,
 (d) said power input section containing a source terminal and a common terminal, said common terminal being connected to one of the leads intended to be connected to the load, said source terminal being connected to the other of said leads, and a first series of effective electrical connection means disposed in an arrangement of mathematical progression, the number of said effective electrical connection means in said series being $N-1$, each one of said first series of electrical connection means comprising an X terminal and a Y terminal, all of said Y terminals in said series being connected together and connected to said source terminal and to the other of the leads intended to be connected to the load, (e) said power output section of each circuit chamber having a common terminal connected to the common terminal of said power input section, and a second series of effective electrical connection means Z disposed in a like arrangement of mathematical progression, each one of said second series of electrical connection means comprising a Z terminal, the number of said Z electrical connection means in said series being $N-1$, (f) said source terminal of said power input section being connected to the first Z terminal in the series of Z terminals of the second electrical connection means of said power output section, each X terminal of said first series of electrical connection means other than the last one thereof being connected to the Z terminal of said second series of electrical connection means which is of the next higher order in the mathematical progression, (g) each of said terminal plugs having a neutral conductor means and a series of openings disposed therein in an arrangement of mathematical progression, the number of openings in said series being $N-1$, said openings comprising groups of Z', X' and Y' terminal receiving means, an effective electrical connection means including a first connector associated with the Z' and X' terminal receiving means of one group and a separate connector associated with the corresponding Y' terminal receiving means of said group, (h) each of said terminal plugs, when operatively disposed, connecting by means of the first connector of said effective electrical connection means in said terminal plugs, a predetermined one of said Z terminals of the power output section of one chamber to a corresponding one of said X terminals of the same order in the mathematical progression of the power input section of the next succeeding circuit chamber, the separate connector of said effective electrical connection means connecting the aforesaid X terminal with its associated Y terminal, said neutral conductor means connecting the common terminal of the power output section of said one terminal of said one circuit chamber to the common terminal of the power input section of the said next succeeding circuit chamber.

5. A system for connecting no more than "N" electrical loads from one power source comprising (a) a plurality of circuit chambers each having at least two leads adapted to be connected to one of the electrical loads, (b) a plurality of terminal plugs each adapted to interconnect electrically two of said circuit chambers to energize the second of said circuit chambers from the first of said circuit chambers, (c) each of said circuit chambers having therein a power input section and a power output section, (d) said power input section comprising a body containing a source terminal and a common terminal, said common terminal being connected to one of the leads intended to be connected to the load, said source terminal being connected to the other of said leads, and a first series of effective electrical connection means disposed in the body in an arrangement of mathematical progression, the number of said electrical connection means in said series being $N-1$, each one of said first series of electrical connection means comprising a prong supported in the body and extending upwardly therefrom and constituting an X terminal, and a hole in the body adjacent said prong and having therein a Y terminal, the prong having a portion extending adjacent said hole, all of said Y terminals in said series being connected to said source terminal, (e) said power output section of each circuit chamber comprising a body containing a common terminal connected to the common terminal of said power input section, and a second series of effective electrical connection means disposed in the body in a like arrangement of mathematical progression, the number of said electrical connection means in said series being $N-1$, each one of said second series comprising a Z terminal located in said body in openings therein, (f) said source terminal of said power input section being connected to the first Z terminal in the series of Z terminals of the second electrical connection means of said power output section, each X terminal of said first series of electrical connection means other than the last one thereof being connected to the Z terminal of said second series of electrical connection means which is of the next higher order in the mathematical progression, (g) each of said terminal plugs having a neutral conductor means and a series of openings disposed therein in an arrangement of mathematical progression, the number of openings in said series being $N-1$, said openings comprising groups of Z', X' and Y' terminal receiving means, an effective electrical connection means comprising, a first connector element having a finger extension at one end adapted to extend through the Z' opening of one group and a pair of flexible fingers at the other end adapted to straddle the X' opening of said one group, said effective electrical connection means further comprising a pin connector adapted to be supported in said terminal plug and extend through the Y' opening of said one group, (h) each of said terminal plugs, when operatively disposed, connecting by means of the finger extension of said first connector element in said effective electrical connection therein, a predetermined one of said Z terminals of the power output section of one chamber to the corresponding one of said X terminals of the same order in the mathematical progression of the power input section of the next succeeding circuit chamber, the prong constituting said one X terminal engaging the flexible fingers of said first connector element, said pin connector extending into the hole in the power input section body adjacent said one prong and connecting it with the Y terminal in said hole, said neutral conductor means connecting the common terminal of the power output section of said one terminal of said one circuit chamber to the common terminal of the power input section of the said next succeeding circuit chamber.

6. An electrical system in accordance with claim 3 wherein
each of the Y terminals in said power input section of each circuit chamber are connected in series with wire leads, one of the leads intended to be connected with the electrical load being connected directly to one of said Y terminals, said source terminal being connected to another one of said Y terminals.

7. An electrical system in accordance with claim 5 wherein
each terminal plug has an elongated groove therein for receiving said neutral conductor means, said groove having openings at each end extending through the terminal plug, said neutral conductor means comprising a flat member having a blade finger at each end adapted to extend through the openings in said groove, the power input section and power output section of each circuit chamber each having a slotted opening therein wherein is located the common terminals thereof, the blade finger at one end of said flat member extending when said terminal plugs are operatively disposed into the slotted opening containing the common terminal in the power output section of one circuit chamber, with the blade finger at the other end of said flat member extending into the slotted opening containing the common terminal in the power input section of the next succeeding circuit chamber.

8. An electrical system in accordance with claim 5 wherein each of said terminal plugs comprises an essentially flat body having a plurality of grooves therein adapted to receive the first connector element in the effective electrical connector means, the Z′, X′ and Y′ terminal receiving means in each group of the mathematical progression being aligned one with the other, and a cover member removably connected with said flat body.

No references cited.

ROBERT K. SCHAEFER, *Primary Examiner.*

M. GINSBURG, *Assistant Examiner.*